United States Patent [19]

Murphy

[11] 4,069,122

[45] Jan. 17, 1978

[54] MOLECULAR-WEIGHT REDUCTION OF NITROCELLULOSE BY ELECTRON BEAM RADIATION

[75] Inventor: Charles Vincent Murphy, Wilmington, Del.

[73] Assignee: E. I. Du Pont de Nemours and Company, Wilmington, Del.

[21] Appl. No.: 636,408

[22] Filed: Dec. 1, 1975

[51] Int. Cl.$^2$ ............................................. B01J 1/10
[52] U.S. Cl. ............................................. 204/158 HE
[58] Field of Search .................. 204/158 HE, 159.12, 204/160.1

[56] References Cited

FOREIGN PATENT DOCUMENTS 245,916   7/1963   Australia ..................... 204/158 HE
830,820   3/1960   United Kingdom ......... 204/158 HE

*Primary Examiner*—Howard S. Williams

[57] ABSTRACT

Nitrocellulose of reduced molecular weight produced from stabilized nitrocellulose in presence of a damping agent, e.g., water, by means of an absorbed dose of ionizing radiation in the range of about 1.0 to 50 megarads at ambient temperature.

7 Claims, No Drawings

MOLECULAR-WEIGHT REDUCTION OF NITROCELLULOSE BY ELECTRON BEAM RADIATION

BACKGROUND OF THE INVENTION

1. Field of the Invention

This invention relates to the molecular-weight reduction of nitrocellulose by means of electron beam radiation.

2. Description of the Prior Art

Nitrocellulose is a product of commerce which is available with variable nitrogen content in a wide range of viscosities. It is an excellent film-forming material useful in lacquers and other types of finishes, coating for cellophane, paper, fabrics and as a component of adhesives, etc. Heretofore nitrocellulose of reduced molecular weight has been prepared by a high temperature, acidic, hydrolytic process. One such process utilizes cellulose sheets in seven steps as follows:

1. comminute cellulose sheet,
2. nitrate comminuted material,
3. stabilize nitrated material in boiling water,
4. digest slurry of nitrocellulose by passing through a digester coil at elevated temperature and pressure,
5. wash,
6. dehydrate material, and
7. compress through rolls (densificated).

It is known from British Pat. No. 830,820 that controlled depolymerization of cellulose, especially in connection with the manufacture of viscose, can be accomplished by subjecting the cellulose to an absorbed dose of ionizing radiation between 0.05 and 60 watt-seconds/gram of cellulose (0.005 to 6.0 megarads). It is known that the stability of nitrocellulose is considerably less than that of cellulose. The nitrate group of nitrocellulose readily breaks down to form NO gas which combines with oxygen to form $NO_2$. Not only could a fire develop from such breakdown, but the $NO_2$ could combine with water or moisture to increase acidity and in turn increase degradation of the nitrocellulose. British Pat. No. 761,051 describes the subjecting of several polymers, including cellulose nitrate, to ionizing radiation in an amount sufficient to bring about an increase in the resistance of the substance to the solvent action of organic solvents but insufficient to cause any substantial change in the mechanical properties of the substance as measured at ordinary temperatures. The amount of ionizing radiation is a small quantity which crosslinks the cellulose nitrate increasing the molecular weight and thereby decreasing solubility. Polymer degradation is not disclosed. By irradiating nitrocellulose safely with relatively large absorbed dosages it has been found surprisingly that nitrocellulose of reduced molecular weight is prepared by a process which results in improved viscosity control, increased productivity and lower energy costs. The irradiation step replaces digestion step (4) described above.

SUMMARY OF THE INVENTION

In accordance with this invention nitrocellulose of reduced molecular weight is provided by a process which comprises subjecting stabilized nitrocellulose in the presence of a damping agent to an absorbed dose of ionizing radiation in the range of about 1.0 to 50 megarads at ambient temperature.

DETAILED DESCRIPTION OF THE INVENTION

The stabilized nitrocellulose (NC) useful in this invention is available in a variety of nitrogen grades. High nitrogen nitrocellulose contains 11.8 to 12.2% by weight nitrogen; medium nitrogen nitrocellulose contains 11.3 to 11.7% by weight nitrogen; and low nitrogen nitrocellulose contains 10.9 to 11.2% by weight nitrogen. "Stabilized nitrocellulose" refers to nitrocellulose which has unstable organic sulfates removed therefrom. The stabilization is accomplished by boiling the nitrocellulose in water for at least about 2 hours. The time for stabilization will vary depending on the nitrogen content of the nitrocellulose. The nitrocellulose can be utilized in any form, e.g., sheeted fluff, flakes, diced, etc.

The nitrocellulose is wet with a suitable damping agent such as water; alcohols, e.g., ethanol, isopropanol, butanol; etc. The solids level of nitrocellulose can range from about 35 to 75% by weight solids. A preferred solids range is 60 to 75% by weight. The higher solids level permits more efficient use of electrical energy. The presence of a damping agent during irradiation is desired since the irradiation of the nitrocellulose produces free radical color formers which are absorbed by the damping agent and then removed during subsequent washing and dewatering operations. See Adolphe Chapiro, Radiation Chemistry of High Polymer, High Polymer, A Series of Monographs on the Chemistry, Physics and Technology of High Polymeric Substances, Vol. XV, John Wiley and Sons, Inc., New York, New York, 1962, page 347, Paragraph D.

The source which provides the ionizing radiation may be an electron beam accelerator capable of producing a beam of electrons having energies of 200 to 1,000 KV. With such an electron beam, relatively large quantities of energy are delivered to a small number of molecules lying in the path of the oncoming electrons. The net result of this type of energy interaction on a chemical system is both excitation and ionization with substantial molecular fragments (polymer degradation).

In addition to the radiation source disclosed in the Examples suitable sources include: Van de Graff generators; isotopic radiation, e.g., cobalt 60, cesium 137 etc. The absorbed radiation dosage levels for irradiating the nitrocellulose ranges from about 1.0 to 50 megarads. The absorbed dosage level for a particular viscosity grade of nitrocellulose is dependent on the percentage of solids and the mass thickness of the nitrocellulose. A range of 2 to 40 megarads is demonstrated in the Examples.

The irradiation is generally conducted at ambient temperature in the air. It is desirable, particularly in large scale operations, to irradiate in an inert atmosphere, e.g., nitrogen, to avoid formation of large amounts of ozone in the surrounding atmosphere.

The process of this invention is advantageous particularly since it results in more efficient energy utilization over current commercial hydrolytic procedures. In addition, narrower molecular-weight distribution and improved viscosity control are achieved.

Many different viscosity grades of nitrocellulose are produced. There are viscosity specifications for each nitrocellulose grade. With the present high temperature, acidic, hydrolytic process, it is frequently necessary to blend widely diverse nitrocellulose viscosity grades in order to obtain in-specification product.

Blending, however, frequently produces nitrocellulose with broad molecular-weight distribution which can result in poor quality product, e.g., hazy nitrocellulose solutions; in the broad range of solvent systems in which nitrocellulose is used. By the process of this invention, however, the irradiation dosage level can be closely controlled and the desired viscosity level achieved. Excellent reproducibility of viscosity in duplicate runs has been achieved over a wide range of dosage levels. The improved nitrocellulose finds use as a film-forming material, coating, as a component of adhesives, etc.

EXAMPLES OF THE INVENTION

The following Examples illustrate the invention. The results of the various tests found in the Examples were obtained by the procedures indicated below.

Viscosity a. Falling Ball Viscosity, ASTM D 301-56. This test measures the viscosity of a solution of nitrocellulose in standard solvent compositions in terms of time required for a 7.94 mm steel ball to fall through 25.4 cm of the solution in a 2.54 cm diameter tube.

b. Brookfield Viscosity is measured by means of the Brookfield LVF Viscometer. The force required to rotate a spindle in a fluid at a definite constant speed is determined. The procedure including spindle size and fluid is described in a manual from Brookfield Engineering Laboratories, Inc.

Gel Permeation Chromatography

This procedure is used to determine quantitatively the molecular weight distribution of a polymer from Gel Permeation Chromatography (G.P.C.) elution curves. The G.P.C. values are relative to polystyrene standard calibration.

MVP Stability Test

ASTM D 301-56 is used to determine whether or not nitrocellulose is properly purified. A small sample (2.5 g.) of dry nitrocellulose is heated at 134.5° C. in the presence of methyl violet paper (MVP) which changes color on contact with acid fumes. The time of heating required to change the color of the paper is recorded as the degree of stability.

EXAMPLE 1

100 g. of a sample of undigested water-wet high nitrogen nitrocellulose 40% solids was irradiated at 10 and 30 megarad absorbed dosage levels to determine if irradiation would cause significant nitrate degradation or result in nitrocellulose instability. The irradiation power source was a General Electric 2 MEV Electron Resonant Transformer. The results are given in Table I. The nitrate degradation in the samples was minimal.

TABLE I

| Sample | Absorbed Dosage (Megarads) | Acidity Irradiation (% as $H_2SO_4$) | Analyzed After Alcohol Dehydration | | | MVP Stability (minutes) |
| --- | --- | --- | --- | --- | --- | --- |
| | | | % Nitrogen (Nitrometer) | Falling Ball Viscosity* (8.38 mm Steel Ball Secs.) | Acidity (% as $H_2SO_4$) | |
| Control | 0 | 0.03 | 12.26 | 79.9 | 0.03 | 19 |
| A | 10 | 0.09 | 12.19 | 30.1 | 0.06 | 19 |
| B | 30 | 0.23 | 12.28 | 3.9 | 0.09 | 13 |

*According to ASTM Method D301-56.

EXAMPLE 2

Approximately 200.0 g. samples of water-wet high nitrogen undigested nitrocellulose were vacuum filtered in the laboratory to a solids content of 42%. The bulk density of the product was 0.2 g./cc. The samples were irradiated by means of the radiation source described in Example 1 over an absorbed dosage level range of 2 to 40 megarads. The results are set forth in Table II.

Eight of the ten duplicate radiation runs show excellent viscosity checks. There were no problems with excessive nitrate degradation as evidenced by the nitrogen analysis and the MVP stability tests. The irradiated samples showed improved molecular-weight uniformity [polydispersity (d)] with increased radiation dosage level.

TABLE II

| Sample | Radiation Conditions | | | Viscosity Data | Gel Permeation Chromatography | | | | Nitrogen (%) (Nitrometer) | MVP Stability Test (Minutes) |
| --- | --- | --- | --- | --- | --- | --- | --- | --- | --- | --- |
| | Exposure Time (Seconds) | Current (Milliamps) | Absorbed Dosage (Megarads) | Falling Ball Visc. (7.94 mm S.B. Secs.) | Brookfield (cps.) | Mw | Mn | d | | |
| 1* | 0 | 0 | 0 | >1000 | >100,000 | 727,300 | 69,121 | 10.5 | 12.54 | 9 |
| 2* | 0 | 0 | 0 | >1000 | >100,000 | 743,680 | 62,717 | 11.9 | 12.37 | 9 |
| A-1 | 21.6 | 1 | 2 | 127.9 | 55,500 | 433,220 | 56,431 | 7.7 | 12.46 | 10 |
| A-2 | 21.6 | 1 | 2 | 121.0 | 58,500 | 396,630 | 57,715 | 6.9 | 12.39 | 10 |
| B-1 | 43.2 | 1 | 4 | 32.2 | 17,500 | 290,500 | 53,071 | 5.5 | 12.38 | 19 |
| B-2 | 43.2 | 1 | 4 | 32.6 | 16,500 | 310,180 | 56,397 | 5.5 | 12.41 | 16 |
| C-1 | 64.8 | 1 | 6 | 11.3 | 5,750 | 292,770 | 58,503 | 5.0 | 12.35 | 11 |
| C-2 | 64.8 | 1 | 6 | 6.7 | 2,700 | 319,350 | 60,455 | 5.3 | 12.45 | 11 |
| D-1 | 108 | 1 | 10 | 3.5 | 1,338 | 188,270 | 41,608 | 4.5 | 12.43 | 15 |
| D-2 | 108 | 1 | 10 | 2.5 | 975 | 179,220 | 46,400 | 3.9 | 12.43 | 15 |
| E-1 | 162 | 1 | 15 | 1.0 | 390 | 126,090 | 31,819 | 4.0 | 12.37 | 11 |
| E-2 | 162 | 1 | 15 | 1.1 | 400 | 121,770 | 32,705 | 3.7 | 12.32 | 14 |
| F-1 | 216 | 1 | 20 | 0.4 | 160 | 113,930 | 29,134 | 3.9 | 12.38 | 15 |
| F-2 | 216 | 1 | 20 | 0.4 | 180 | 125,660 | 31,246 | 4.0 | 12.43 | 18 |
| G-1 | 270 | 1 | 25 | 0.25 | 85 | 77,511 | 22,747 | 3.4 | 12.31 | 15 |
| G-2 | 270 | 1 | 25 | 0.28 | 85 | 82,174 | 24,473 | 3.4 | 12.25 | 19 |
| H-1 | 324 | 1 | 30 | 0.208 | 48 | 69,296 | 20,403 | 3.4 | 12.33 | 10 |
| H-2 | 324 | 1 | 30 | 0.201 | 42 | 65,750 | 20,468 | 3.2 | 12.35 | 10 |
| I-1 | 378 | 1 | 35 | 0.184 | 30 | 49,715 | 16,146 | 3.1 | 12.20 | 15 |
| I-2 | 378 | 1 | 35 | 0.158 | 24.5 | 51,587 | 16,146 | 3.2 | 12.18 | 13 |
| J-1 | 432 | 1 | 40 | 0.13 | 21.5 | 42,983 | 14,674 | 2.9 | 12.15 | 11 |

TABLE II-continued

| | Radiation Conditions | | | Viscosity Data | Gel Permeation Chromatography | | | | Nitrogen (%) (Nitrometer) | MVP Stability Test (Minutes) |
|---|---|---|---|---|---|---|---|---|---|---|
| Sample | Exposure Time (Seconds) | Current (Milliamps) | Absorbed Dosage (Megarads) | Falling Ball Visc. (7.94 mm S.B. Secs.) | Brookfield (cps.) | Mw | Mn | d | | |
| J-2 | 432 | 1 | 40 | 0.134 | 28.5 | 45,689 | 15,007 | 3.0 | 12.19 | 11 |

*Control

EXAMPLE 3

Previous irradiations were made using only high nitrogen (11.8–12.2% nitrogen), undigested nitrocellulose. The following set of data also includes medium nitrogen (11.3–11.7% nitrogen) and low nitrogen (10.9–11.2% nitrogen) nitrocellulose. In addition, all nitrogen grades of nitrocellulose were irradiated at a higher solids level (~60%) to obtain improved energy utilization. The percent solids and bulk density of the three nitrogen levels of nitrocellulose are as follows:

gen irradiation nitrocellulose samples show a higher solids level of nitrocellulose (60 vs. 42% as shown in Example 2) does give lower viscosities at comparable dosage levels. This confirms the improved energy utilization at higher nitrocellulose solids. The data in Table III also show that the lower nitrogen levels of nitrocellulose require higher radiation dosages to obtain comparable viscosity levels. In all cases where duplicate runs were made, the reproducibility of viscosity data was very good. The irradiated nitrocellulose samples generally showed improved molecular-weight distribution [polydispersity (d)] with increased radiation dosage level.

TABLE III

| | Radiation Conditions | | | % Acidity as $H_2SO_4$ After Radiation | Viscosity Data | | Gel Permeation Chromatography | | | Nitrogen (%) (Nitrometer) | MVP Stability Test (Minutes) |
|---|---|---|---|---|---|---|---|---|---|---|---|
| Sample | Exposure Time (Secs.) | Current (Milliamps) | Absorbed Dosage (Megarads) | | Falling Ball Viscosity (7.94 mm S.B. Secs.) | Brookfield (cps.) | Mw | Mn | d | | |
| Low Nitrogen Nitrocellulose | | | | | | | | | | | |
| Control** | 0 | 0 | 0 | — | 147.3 | 45,000 | 503,470 | 20,390 | 24.7 | 11.14 | 15 |
| A-1 | 35.6 | 1 | 3.3 | 0.07 | 67.7 | 28,750 | 376,770 | 116,570 | 3.2 | 11.16 | 12 |
| A-2 | 35.6 | 1 | 3.3 | 0.12 | 62.0 | 26,000 | 351,770 | 103,270 | 3.0 | 11.12 | 11 |
| B-1 | 86.4 | 1 | 8 | 0.20 | 5.2 | 2,800 | 245,550 | 64,626 | 3.8 | 11.05 | 11 |
| B-2 | 86.4 | 1 | 8 | 0.28 | 5.2 | 2,900 | 215,910 | 51,941 | 4.2 | 10.95 | 11 |
| C-1 | 216 | 1 | 20 | 0.30 | 0.65 | 239 | 124,490 | 23,872 | 5.2 | 11.00 | 9 |
| C-2 | 216 | 1 | 20 | 0.30 | 0.58 | 213 | 112,760 | 22,221 | 5.1 | 10.99 | 9 |
| D-1 | 291.6 | 1 | 27 | 0.20 | 0.27 | 99 | 95,616 | 21,610 | 4.4 | 10.88 | 9 |
| D-2 | 291.6 | 1 | 27 | 0.20 | 0.27 | 101 | 95,791 | 23,351 | 4.1 | 11.04 | 9 |
| E-1 | 378 | 1 | 35 | 0.17 | 0.14 | 53 | 66,109 | 18,227 | 3.6 | 10.78 | 8 |
| E-2 | 378 | 1 | 35 | 0.20 | 0.11 | 40 | 67,691 | 19,427 | 3.5 | 10.76 | 8 |
| Medium Nitrogen Nitrocellulose | | | | | | | | | | | |
| Control** | 0 | 0 | 0 | — | 77.3 | 39,500 | 907,290 | 66,263 | 13.7 | 11.72 | 16 |
| A-1 | 89.6 | 1 | 8.3 | 0.12 | 3.3 | 1,300 | 265,990 | 47,093 | 5.6 | 11.47 | 11 |
| B-1 | 89.6 | 1 | 8.3 | 0.15 | 3.6 | 1,400 | 238,460 | 46,181 | 5.2 | 11.42 | 12 |
| A-2 | 216 | 1 | 20 | 0.30 | 0.46 | 169 | 132,341 | 30,104 | 4.4 | 11.35 | 23 |
| B-2 | 216 | 1 | 20 | 0.33 | 0.39 | 144 | 126,410 | 29,648 | 4.3 | 11.32 | 23 |
| High Nitrogen Nitrocellulose | | | | | | | | | | | |
| Control** | 0 | 0 | 0 | — | 118.5 | 58,500 | 1,038,800 | 76,454 | 13.6 | * | 7 |
| A | 21.6 | 1 | 2 | 0.28 | 77.3 | 28,500 | 369,790 | 56,776 | 6.5 | * | 7 |
| B | 43.2 | 1 | 4 | 0.25 | 18.0 | 7,650 | 255,210 | 62,516 | 4.1 | * | 7 |
| C | 64.8 | 1 | 6 | 0.20 | 6.8 | 2,780 | 222,440 | 45,674 | 4.9 | * | 7 |
| D-1 | 89.6 | 1 | 8.3 | 0.08 | 2.7 | 1,250 | 212,530 | 39,817 | 5.3 | * | 6 |
| D-2 | 89.6 | 1 | 8.3 | 0.12 | 2.9 | 1,760 | 237,520 | 47,031 | 5.1 | * | 5 |
| E | 108 | 1 | 10.0 | 0.20 | 1.57 | 650 | 135,970 | 35,472 | 3.8 | * | 7 |
| F-1 | 162 | 1 | 15.0 | 0.17 | 0.57 | 194 | 124,360 | 34,357 | 3.6 | * | 7 |
| F-2 | 162 | 1 | 15.0 | 0.17 | 0.54 | 210 | 117,380 | 29,501 | 3.9 | * | 7 |
| G-1 | 216 | 1 | 20.0 | 0.18 | 0.31 | 112 | 99,138 | 23,822 | 4.2 | * | 5 |
| G-2 | 216 | 1 | 20.0 | 0.27 | 0.22 | 82 | 91,558 | 26,258 | 3.5 | * | 5 |
| H-1 | 270 | 1 | 25.0 | 0.30 | 0.18 | 67 | 83,354 | 20,456 | 3.8 | * | 6 |
| H-2 | 270 | 1 | 25.0 | 0.32 | 0.16 | 58 | 84,313 | 22,632 | 3.7 | * | 6 |
| I-1 | 378 | 1 | 35.0 | 0.20 | 0.048 | 17.6 | 53,204 | 14,123 | 3.8 | * | 6 |
| I-2 | 378 | 1 | 35.0 | 0.20 | 0.043 | 15.9 | — | — | — | * | 6 |
| J-1 | 432 | 1 | 40.0 | 0.18 | 0.029 | 10.7 | — | — | — | * | — |
| J-2 | 432 | 1 | 40.0 | 0.20 | 0.031 | 11.2 | 62,141 | 17,510 | 3.5 | 11.91 | 15 |

*Samples were prepared in the dry state to facilitate analysis. The samples were stored for 6 weeks in this state. Prolonged storage of nitrocellulose in the dry state accelerates nitrate degradation; hence, the samples did not meet the minimum stability requirements (8 minutes) for determining nitrogen analysis.
**Viscosity data for control samples were based on 8% solids in standard solvent system. All other viscosity data are based on 12.2% solids.

| Nitrocellulose (Nitrogen Level)[1] | Solids (%) | Bulk Density (g./cc.) |
|---|---|---|
| 10.9–11.2 | 57.2 | 0.160 |
| 11.3–11.7 | 64.7 | 0.168 |
| 11.8–12.2 | 57.0 | 0.160 |

[1]Industrial NC is usually nitrated to a higher nitrogen level (+0.1 to 0.2% nitrogen) to allow for some nitrate degradation which occurs during the hydrolytic molecular-weight reduction step.

The procedure of Example 1 was repeated, the data and results being set forth in Table III. The high nitro-

EXAMPLE 4

Industrial Termeered (centrifuged) nitrocellulose generally has a solids level ranging from 65 to 72%. To further improve energy utilization, the following nitrocellulose samples (170.0 g.) were centrifuged and oven dried at 60° C. to approximate a solids levels range of 65 to 75%.

| Nitrocellulose (Nitrogen Level) | Solids (%) | Bulk Density (g./cc.) |
|---|---|---|
| 10.9–11.2 | 65.3 | 0.176 |
| 11.3–11.7 | 71.6 | 0.159 |
| 11.8–12.2 | 68.7 | 0.152 |
| 11.8–12.2 | 74.9 | 0.153 |

The procedure of Example 1 was repeated, the data and results being set forth in Table IV.

The nitrocellulose radiation data reported in Example 4 shows further improvement in energy utilization as the nitrocellulose solids is increased.

agent to an absorbed dose of ionizing radiation in the range of about 1.0 to 50 megarads at ambient temperature.

2. A process according to claim 1 wherein the absorbed dose of ionizing radiation is in the range of 2 to 40 megarads.

3. A process according to claim 1 wherein the nitrocellulose is present in the amount of 35 to 75% by weight solids.

4. A process according to claim 1 wherein the irradiation takes place in an inert atmosphere.

5. A process according to claim 4 wherein the inert atmosphere is nitrogen.

6. A process according to claim 1 wherein the damping agent is water.

TABLE IV

| Sample | Radiation Conditions | | | % Acidity as $H_2SO_4$ After Radiation | Viscosity Data | | Gel Permeation Chromatography | | | Nitrogen (%) (Ni-trometer) | MVP Stability Test (Minutes) |
|---|---|---|---|---|---|---|---|---|---|---|---|
| | Exposure Time (Secs.) | Current (Milli-amps) | Absorbed Dosage (Megarads) | | Falling Ball Viscosity (7.94 mm S.B. Secs.) | Brook-field (cps.) | Mw | Mn | d | | |
| Low Nitrogen Nitrocellulose | | | | | | | | | | | |
| Control | 0 | 0 | 0 | — | 15.2 | 7,420 | 523,580 | 60,553 | 8.6 | 11.00 | 14 |
| A | 38.9 | 1 | 3.6 | 0.21 | 9.5 | 4,700 | 281,850 | 48,265 | 5.8 | 10.94 | 37 |
| B | 82.1 | 1 | 7.6 | 0.37 | 2.7 | 1,300 | 165,310 | 27,944 | 5.9 | 10.89 | 33 |
| C | 108.0 | 1 | 10.0 | 0.46 | 1.3 | 630 | 139,870 | 31,157 | 4.5 | 10.93 | 23 |
| D | 162.0 | 1 | 15.0 | 0.61 | 0.57 | 238 | 107,260 | 21,242 | 5.0 | 10.75 | 28 |
| E | 216.0 | 1 | 20.0 | 1.05 | 0.37 | 136 | 85,378 | 20,174 | 4.2 | 10.43 | 17 |
| F-1 | 270.0 | 1 | 25.0 | 1.15 | 0.16 | 59 | 71,296 | 19,331 | 3.7 | 10.54 | 10 |
| F-2 | 270.0 | 1 | 25.0 | 1.32 | 0.18 | 66 | 66,510 | 17,923 | 3.7 | 10.40 | 10 |
| G | 324.0 | 1 | 30.0 | 1.62 | 0.14 | 51 | 53,949 | 14,464 | 3.7 | — | 13 |
| H-1 | 367.2 | 1 | 34.0 | 1.69 | 0.10 | 37 | 46,708 | 14,812 | 3.1 | 10.64 | 14 |
| H-2 | 367.2 | 1 | 34.0 | 2.40 | 0.13 | 48 | 51,117 | 14,373 | 3.6 | 10.66 | 8 |
| I-1 | 432.0 | 1 | 40.0 | 1.88 | 0.057 | 21 | 43,956 | 9,738 | 4.5 | 10.75 | 17 |
| I-2 | 432.0 | 1 | 40.0 | 1.99 | 0.067 | 24.5 | 43,380 | 11,568 | 3.7 | 10.38 | 14 |
| Medium Nitrogen Nitrocellulose | | | | | | | | | | | |
| Control | 0 | 0 | 0 | — | 76.8 | 18,200 | 726,930 | 65,282 | 11.1 | 11.60 | 13 |
| A | 32.4 | 1 | 3.0 | 0.15 | 18.4 | 8,260 | 228,460 | 41,826 | 5.5 | 11.50 | 28 |
| A-1 | 54.0 | 1 | 5.0 | 0.24 | 6.8 | 3,060 | 176,890 | 30,908 | 5.7 | 11.45 | 35 |
| A-2 | 54.0 | 1 | 5.0 | 0.21 | 7.7 | 3,288 | 158,020 | 24,720 | 6.4 | 11.51 | 12 |
| B-1 | 81.0 | 1 | 7.5 | 0.39 | 2.5 | 1,108 | 152,950 | 33,692 | 4.5 | 11.44 | 35 |
| B-2 | 81.0 | 1 | 7.5 | 0.33 | 2.4 | 1,113 | 146,040 | 33,316 | 4.4 | 11.45 | 35 |
| C-1 | 108.0 | 1 | 10.0 | 0.48 | 1.35 | 585 | 132,660 | 29,710 | 4.5 | 11.46 | 28 |
| C-2 | 108.0 | 1 | 10.0 | 1.43 | 1.30 | 565 | 137,370 | 25,374 | 5.4 | 11.40 | 28 |
| D | 162.0 | 1 | 15.0 | 0.74 | 0.43 | 163 | 104,090 | 22,393 | 4.6 | 11.40 | 22 |
| E-1 | 189.0 | 1 | 17.5 | 0.84 | 0.34 | 125 | 88,607 | 18,890 | 4.7 | 11.34 | 20 |
| E-2 | 189.0 | 1 | 17.5 | 0.81 | 0.32 | 118 | 69,737 | 21,434 | 3.3 | 11.33 | 19 |
| F-1 | 216 | 1 | 20.0 | 1.00 | 0.22 | 81 | 83,006 | 18,776 | 4.4 | 11.41 | 21 |
| F-2 | 216 | 1 | 20.0 | 0.89 | 0.21 | 77 | 86,144 | 19,687 | 4.4 | 11.35 | 20 |
| G-1 | 237.6 | 1 | 22.0 | 0.82 | 0.16 | 59 | 81,863 | 23,181 | 3.5 | 11.37 | 20 |
| G-2 | 237.6 | 1 | 22.0 | 2.90 | 0.16 | 59 | 76,856 | 20,015 | 3.8 | 11.29 | 19 |
| H | 270.0 | 1 | 25.0 | 1.07 | 0.11 | 41 | 68,610 | 16,875 | 4.1 | 11.29 | 22 |
| High Nitrogen Nitrocellulose | | | | | | | | | | | |
| Control | 0 | 0 | 0 | — | 1500+ | >100,000 | 954,470 | 108,240 | 8.8 | 12.51 | 9 |
| A-1 | 5.4 | 1 | 0.5 | 0.20 | 800+ | >100,000 | 587,970 | 65,800 | 8.9 | 12.40 | 13 |
| A-2 | 5.4 | 1 | 0.5 | 0.21 | 800+ | >100,000 | 628,090 | 62,046 | 10.1 | 12.36 | 12 |
| B-1 | 13.0 | 1 | 1.2 | 0.27 | 148.6 | 72,300 | 455,680 | 73,302 | 6.2 | — | 10 |
| B-2 | 13.0 | 1 | 1.2 | 0.25 | 154 | 69,700 | 452,330 | 45,922 | 9.8 | 12.38 | 10 |
| C | 17.3 | 1 | 1.6 | 0.28 | 95.1 | 47,000 | 463,730 | 78,072 | 5.9 | — | 13 |
| D | 21.6 | 1 | 2.0 | 0.30 | 73.7 | 33,900 | 434,990 | 57,914 | 7.7 | — | 10 |
| E-1 | 32.4 | 1 | 3.0 | 0.38 | 26.3 | 14,560 | 377,990 | 49,265 | 7.7 | 12.30 | 12 |
| E-2 | 32.4 | 1 | 3.0 | 0.34 | 29.5 | 14,560 | 379,930 | 42,602 | 8.9 | 12.30 | 9 |
| F | 43.2 | 1 | 4.0 | 0.44 | 14.8 | 7,400 | 390,720 | 70,119 | 5.6 | — | 12 |
| G-1 | 68.0 | 1 | 6.3 | 0.52 | 5.1 | 2,528 | 214,480 | 38,286 | 5.6 | 12.43 | 12 |
| G-2 | 68.0 | 1 | 6.3 | 0.48 | 5.4 | 2,760 | 216,250 | 40,994 | 5.3 | — | 14 |
| H | 108.0 | 1 | 10.0 | 0.86 | 1.1 | 456 | 145,330 | 36,283 | 4.1 | 12.35 | 13 |
| I | 162.0 | 1 | 15.0 | 0.70 | 0.76 | 279 | 111,060 | 28,148 | 3.9 | 12.39 | 13 |
| J-1 | 205.2 | 1 | 19.0 | 1.16 | 0.26 | 96 | 91,302 | 26,077 | 3.5 | 12.36 | 8 |
| J-2 | 205.2 | 1 | 19.0 | 1.09 | 0.24 | 88 | 85,525 | 27,011 | 3.9 | 12.11 | 12 |
| K-1 | 280.8 | 1 | 26.0 | 1.54 | 0.16 | 59 | 64,097 | 17,874 | 3.6 | — | 7 |
| K-2 | 280.8 | 1 | 26.0 | 1.48 | 0.14 | 52 | 63,347 | 18,300 | 3.5 | — | 6 |
| L | 302.4 | 1 | 28.0 | 1.64 | 0.125 | 46 | 60,783 | 18,071 | 3.4 | 12.24 | 10 |
| M-1 | 324.0 | 1 | 30.0 | 1.80 | 0.059 | 21.7 | 52,075 | 16,565 | 3.1 | 12.26 | 15 |
| M-2 | 324.0 | 1 | 30.0 | 1.63 | 0.062 | 22.8 | 53,430 | 16,295 | 3.3 | 12.25 | 10 |
| N-1 | 356.4 | 1 | 33.0 | 2.28 | 0.044 | 16.3 | 47,864 | 15,022 | 3.3 | — | 6 |
| N-2 | 356.4 | 1 | 33.0 | 1.93 | 0.049 | 19.2 | 51,857 | 16,173 | 3.2 | 12.18 | 15 |

I claim:

1. Irradiation process for producing nitrocellulose of reduced molecular weight which comprises subjecting stabilized nitrocellulose in the presence of a damping 7. A process according to claim 1 wherein the ionizing radiation is from an electron beam radiation source.

* * * * *